United States Patent [19]

Alexander, III

[11] Patent Number: 5,743,339
[45] Date of Patent: Apr. 28, 1998

[54] TRACTOR HITCH AND METHOD

[76] Inventor: William J. Alexander, III, P.O. Box 848, Mauldin, S.C. 29662

[21] Appl. No.: 598,991

[22] Filed: Feb. 9, 1996

[51] Int. Cl.[6] ........................................ B60D 1/00
[52] U.S. Cl. .................... 172/272; 37/468; 172/439
[58] Field of Search ........................ 172/272, 275, 172/439; 280/477; 37/468

[56] References Cited

U.S. PATENT DOCUMENTS

| | | |
|---|---|---|
| 2,822,739 | 2/1958 | Altgelt . |
| 3,292,949 | 12/1966 | Restall .................... 172/272 |
| 3,306,630 | 2/1967 | Weiste .................... 172/272 |
| 3,379,457 | 4/1968 | Restall et al. ............. 172/272 |
| 3,951,435 | 4/1976 | Greatbach . |
| 4,015,855 | 4/1977 | Murray . |
| 4,069,885 | 1/1978 | Gego et al. . |
| 4,431,207 | 2/1984 | Langenfeld et al. . |
| 4,477,101 | 10/1984 | Nilsson et al. ............. 172/272 |
| 4,509,768 | 4/1985 | Haug . |

FOREIGN PATENT DOCUMENTS

| | | | |
|---|---|---|---|
| 2103240 | 8/1972 | Germany ................. | 172/272 |
| 6415263 | 7/1965 | Netherlands ............. | 172/272 |
| 1083936 | 4/1984 | U.S.S.R. .................. | 172/272 |
| 868473 | 5/1961 | United Kingdom . | |
| 1110361 | 4/1968 | United Kingdom ....... | 172/272 |
| 1369935 | 10/1974 | United Kingdom ....... | 172/272 |
| 1568052 | 5/1980 | United Kingdom ....... | 172/272 |

OTHER PUBLICATIONS

Chapin Equipment Co., Triangle Quick Coupling System. Reference is made to an independent study of quick-hitches conducted in 1984 by Perrson & Kofoed, although the nature of the tests and the date of the attached document are unknown.

Primary Examiner—Terry Lee Melius
Assistant Examiner—Christopher J. Novosad
Attorney, Agent, or Firm—Ralph Bailey

[57] ABSTRACT

A tractor hitch engageable and disengageable by an operator without leaving a tractor seat includes an upwardly and inwardly tapering cam (A) carried by a tractor at three-point hitch locations for engagement between inwardly extending marginal guides (C) integral with a complementary substantially wedge shaped cam follower (B) carried by an implement. The method includes positioning the cam below the cam follower and then lifting the cam by raising hydraulic lift arms (D) carried by the tractor exerting a guiding action between the cam and the cam follower bringing them into interlocking relation for thereafter automatically engaging a latch (E) dislodgement of the cam from the cam follower as during transport of the implement may be avoided.

34 Claims, 7 Drawing Sheets

1
TRACTOR HITCH AND METHOD

BACKGROUND OF THE INVENTION

This invention relates to an improved hitch and method for easily and quickly connecting and disconnecting an implement to a tractor.

The connection of three-point hitches on tractors to corresponding connections on farm implements constitutes an onerous task requiring much back and forth movement of the tractor to achieve the required precise alignment of the lower connections on hydraulic lift arms with corresponding connections on the implement. The upper connection is likewise difficult to make. While the effects of lateral sway of the lift arms on alignment for purposes of attachment are counteracted in part by lateral stabilizer bars, it is rare that proper alignment is achieved on initial efforts in backing so as to then make possible the considerable connections which must be made manually for securing a three-point hitch to the implement.

An effort to solve these problems includes a three-point hitch attachment marketed by Northern Hydraulics, Inc. wherein spaced lower U-shaped brackets as well as an upper U-shaped bracket are carried by a frame connected at the corresponding three points on the tractor. The U-shaped brackets extend rearwardly for supporting the three connecting points on the implement. In practice it is difficult to achieve alignment of the U-shaped brackets with the connecting points on the implement.

U.S. Pat. No. 4,069,885 discloses a hitch having three-point attachment of an inverted V shaped frame for lifting by a tractor into a recess of an inverted V shape in a connecting device carried by an implement. No provision for self alignment is disclosed. U.S. Pat. No. 4,509,768 discloses a tractor hitch utilizing a horizontal transverse pin carried between cheek plates which gradually straddle a downwardly tapering triangular leg depending from a horizontal leg which extends outwardly from the top of a vertical mounting plate on an implement. After upward movement of the pin and cheek plates, the base of the triangular leg, which is slightly shorter than the distance between the cheek plates, is confined between the cheek plates and beneath the hook formed by the downwardly extending triangular leg and is approximately centered with respect to the axes of the vehicle. There are no marginal guiding surfaces on the cheek plates for self alignment purposes. British Patent No. 868,473 of May 17, 1961 discloses a hook carried at the top of a triangular male frame member on a tractor extending through a triangular female frame member which together with a latch at lower end of the female frame member secures the implement to the tractor for transport. However, there are no marginal guiding surfaces receiving a male insert in interlocking relation therebetween.

The prior art is further exemplified by U.S. Pat. Nos. 4,015,855 and 4,431,207, both of which illustrate apparatus for securing agricultural implements to tractors utilizing three-point hitches. The object of both patents is to provide apparatus for engaging and disengaging an implement or tow vehicle wherein the operator does not have to leave the tractor. The apparatus of both of these patents rely upon engagement of a tongue of the implement between members presenting aligned holes for receiving a vertical hitch pin actuated by a fluid operated cylinder. The alignment problems presented by these patented apparatus appear to be nearly as great as those presented by conventional hitches. The prior art is further illustrated by U.S. Pat. Nos. 2,635,890, 2,822,739, 2,983,523, 3,716,253, 3,856,331, 3,889,979 and 3,951,435.

SUMMARY OF THE INVENTION

Accordingly, it is an important object of the present invention to provide an automatic tractor hitch which may be readily aligned and automatically secured without the operator leaving the tractor seat.

Another important object of the invention is to provide an automatic three-point tractor hitch for a farm implement or tow vehicle and the like which is self-aligning in order to avoid the necessity for achieving precise alignment while backing the tractor into position to make the connections.

Still another object of the invention is the provision of a spring operated latch, releasable by the operator from the tractor seat, for loosely fastening hitch members carried by the tractor and by the implement, respectively, together avoiding dislodgement as may result from the lift arms being lowered by gravity or in the event of an obstacle being encountered in operation.

It has been found that an automatic tractor hitch and method of attachment which is quick, easy and self-aligning can be facilitated utilizing an upwardly converging tapering cam follower carried by the implement to accommodate a vertically moveable cam for effecting alignment during connection and for providing bearing surfaces connecting the cam and cam follower during operation of the implement. The hitch of the present invention is self-aligned for making connection and may be disconnected by the operator without leaving the tractor seat. Self alignment is achieved by engagement of the cam with at least one of a pair of forwardly and inwardly tapering lips carried by opposite sides of the cam. The cam pulls the cam and cam follower laterally and forwardly relative to each other and into alignment and wedging engagement as a result of such engagement and the inwardly tapering lips are supported by the cam when in full engagement therewith.

Another important object of the invention is to provide a hitch as an attachment which may be readily adapted and secured at the spaced locations provided for securement of a conventional three-point hitch on implements and on tractors of all conventional categories.

While the invention is described and illustrated in the context of a farm type tractor for towing and lifting agricultural implements and tow vehicles for securement of conventional three-point hitches and the like it is to be understood that the invention may be employed with other forms of tractors, lift trucks, towing and towed vehicles, such as pans on loaders. Attachment of other implements such as buckets on the front ends of tractors, attachment of blades such as those used for snow removal and the like, may also be facilitated by modifications of the embodiments illustrated herein.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a hitch for automatically securing an implement for pulling and lifting by a tractor having an upright cam A carried on the tractor. The cam A is carried on hydraulic lift arms at pivotal connecting points for a standard three-point hitch. A pair of guides having opposed upwardly and inwardly tapering camming surfaces extend forwardly across the cam and are integrally carried on respective sides of the cam. A complementary cam follower B is carried forwardly on the implement for engagement and support by the upright cam in interlocking relation for lifting and towing the implement during transport. The cam follower B carries a pair of opposed marginal aligned elements or lips C which extend integrally forwardly and tapering inwardly across the cam follower B. The lips C which also taper upwardly and inwardly present marginal guiding surfaces engaging the marginal camming surfaces of the cam A which are complementary thereto for engaging and guiding the cam follower laterally relative to the cam for interlocking wedging engagement with the cam.

Hydraulically operated lift arms D carry the cam A for vertical movement between the lips on the cam follower for effecting such interlocking engagement. Automatically engageable latching means E secure the cam follower in such interlocking engagement in respect to the cam. The latching means secure the cam against dislodgement when the hydraulic lift arms are lowered by gravity. Thus, the hitch may be automatically secured by an operator while seated upon the tractor without leaving the seat.

Figure 1:
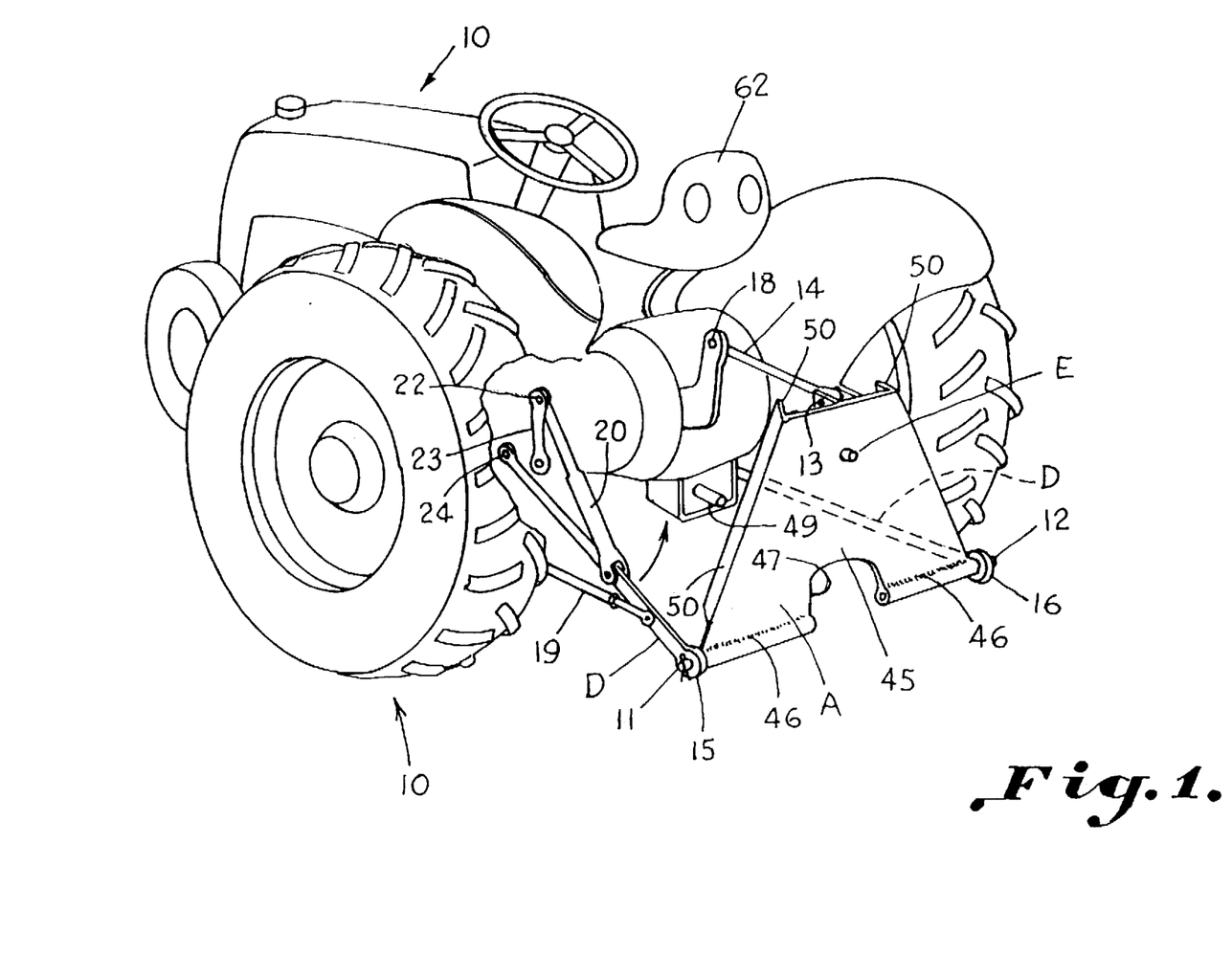
FIG. 1 is a left perspective view illustrating a tractor equipped with a vertically moveable transverse cam carried by a tractor for engaging a complementary cam follower carried by a farm implement, constructed in accordance with the invention.
Figure 2:
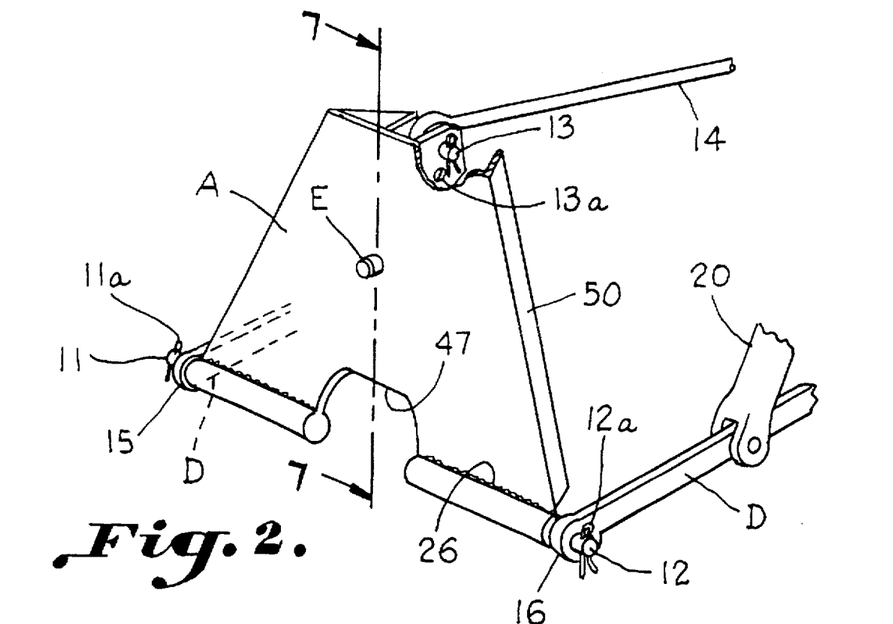
FIG. 2 is an enlarged right perspective view further illustrating the cam and three-point mounting on the tractor.
Figure 4:
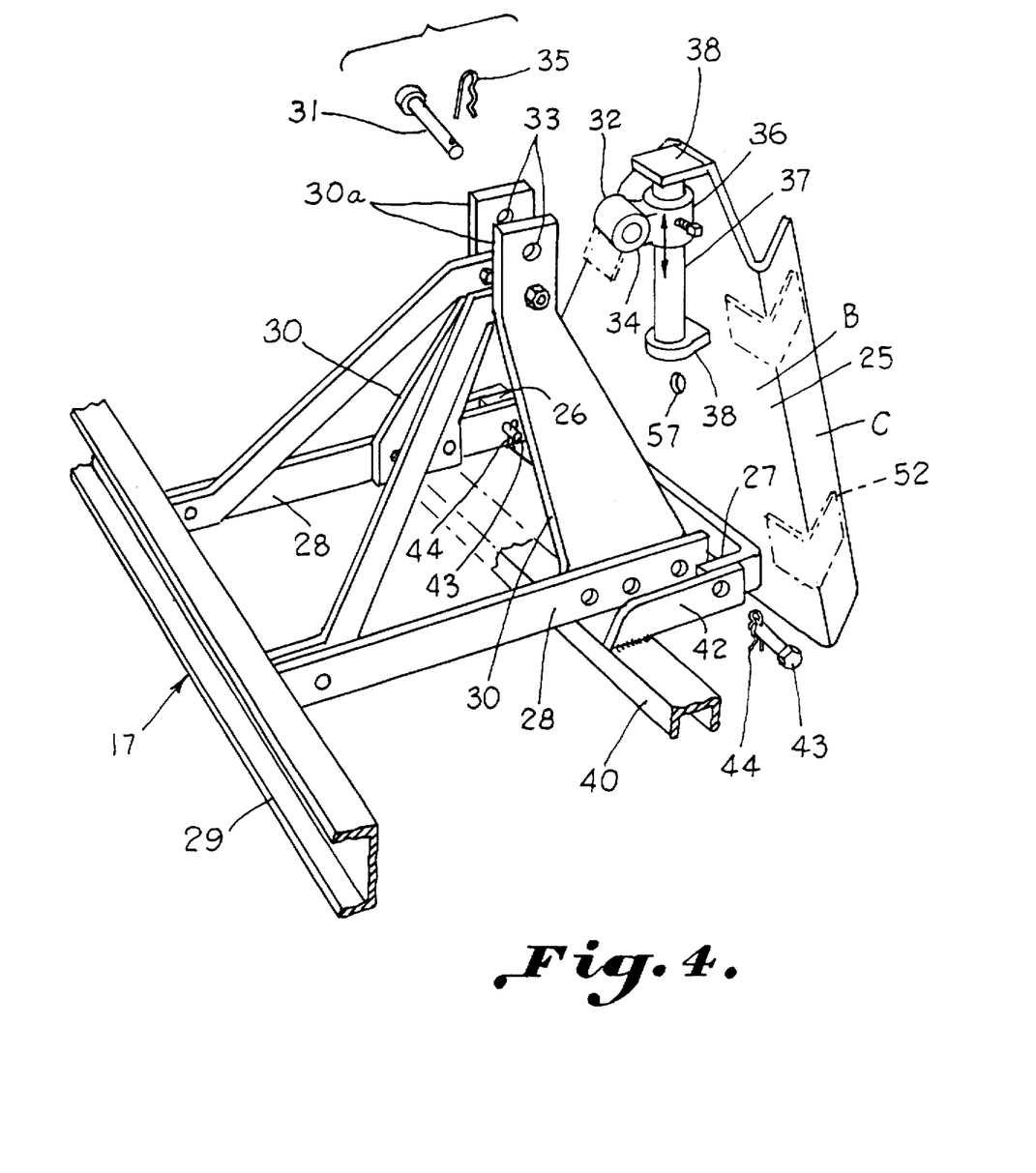
FIG. 4 is an enlarged rear perspective view further illustrating the three-point attachment of the cam follower to the implement.
Figure 5:
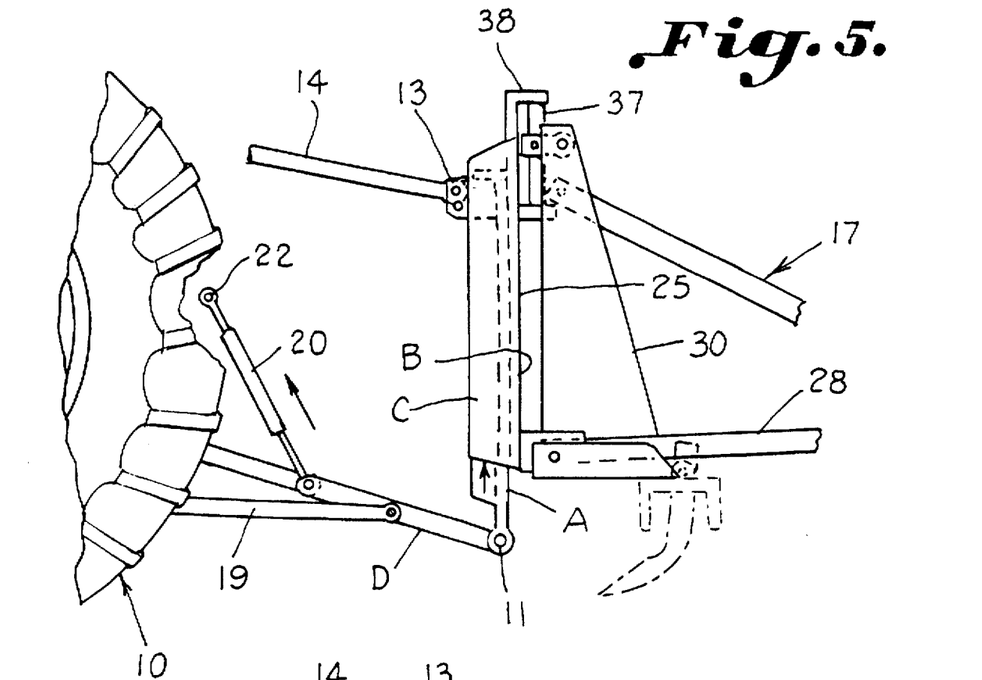
FIG. 5 is a schematic side elevation illustrating the parts in engagement with the cam follower between the inwardly tapering camming element exerting camming action upon each other preparatory to further lifting of the cam which had been positioned below the cam follower for lifting into such engagement.

The upright cam A is illustrated as being carried transversely on the tractor which is broadly designated as at 10 in FIGS. 1 and 5. The cam has stub shafts 11 and 12 at each of the lower corners as best shown in FIGS. 1 and 2. A pin 13 is illustrated at a central upper location on the cam providing a pivotal connection to the top bar 14 of a standard three-point hitch. The stub shafts 11 and 12 are pivotally secured in end bearings 15 and 16 of respective hydraulic lift arms D. The cam is best illustrated in FIGS. 1 and 2 as being thus suitably secured at locations normally provided for connecting a standard three-point hitch. The cam A is configured as an insert or male member for reception by the cam follower B best illustrated in FIGS. 3 and 4 as the female component of the hitch. The cam follower B is mounted upon a farm implement illustrated, for example, as a box leveler broadly designated at 17 and attached at standard three-point locations.

Referring again further to FIGS. 1 and 2, it will be observed that the respective stub shafts 11 and 12 are retained within the respective end bearing members 15 and 16 by suitable fasteners such as quick disconnect pins 11a and 12a. The pin 13 is illustrated as being received in an end bearing 14a of the top bar 14, FIGS. 2–8. The top bar 14 is connected on the other end by a suitable pin 18 to a bracket carried by the tractor. The pin 13 may be suitably fastened within a bracket 13a carried by the cam A by a quick disconnect pin 13b, FIG. 2 for completing the upper pivotal three-point connection.

The lift arms D each have suitable connection to a standard sway bar 19 and a lost motion coupling 20, FIG. 1. The lost motion coupling is pivotally connected as at 22 to a hydraulically operated link 23 which is powered by suitable hydraulic means on the tractor to exert a lifting action by a counterclockwise movement as shown by the arrows in FIG. 1. The lift arms D may be pivotally connected to the tractor as at 24.

Figure 3:
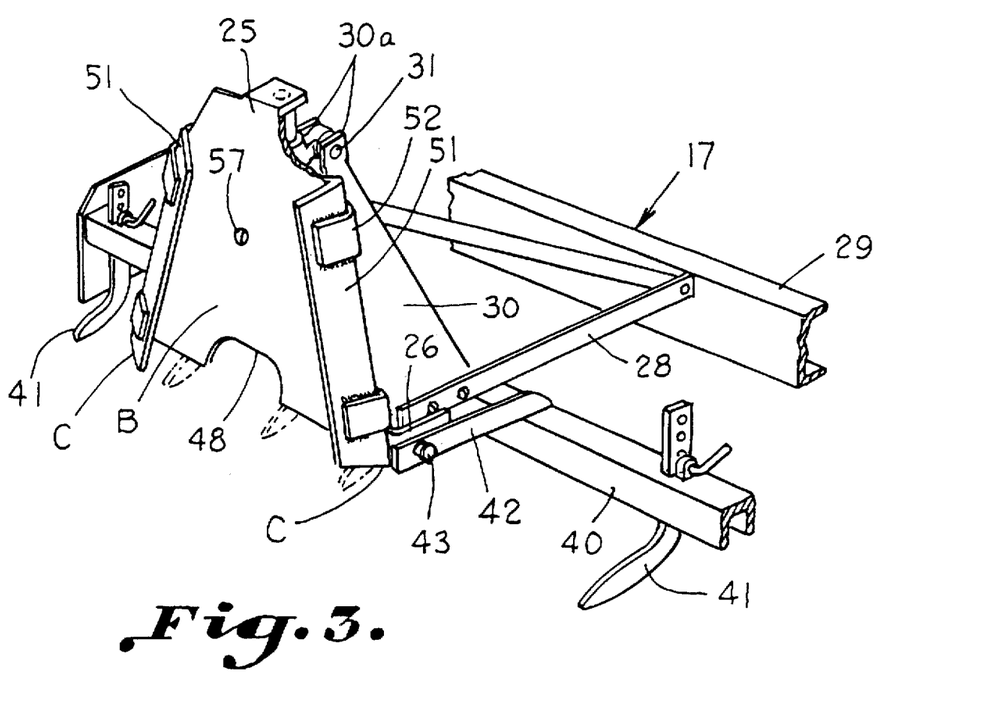
FIG. 3 is a perspective view illustrating an upright cam follower having inwardly and forwardly tapering camming elements thereon mounted on a farm implement for reception of the cam carried by the tractor.

Referring more particularly to FIG. 3, the cam follower B is illustrated as including a plate 25 which extends upwardly and inwardly so as to be complementary to the substantially wedge shaped cam A acting as a receptacle or female member for receiving the cam. The cam follower has brackets carried at a lower rear portion of the plate with rearwardly extending arms 26 and 27, as shown in FIG. 4, for securement to respective longitudinal frame members 28. The longitudinal frame members 28 provide a connection between a transverse rear frame member 29 and a spaced aligned transverse horizontal frame member 40. Supports 42 carried by the transverse horizontal frame member 40 are positioned opposite the frame members 28 for confining the respective arms 26 and 27 therebetween. The implement 17 includes centrally disposed, inwardly tapering side brackets 30 which converge upwardly to provide spaced supports 30a having openings 33 for receiving a horizontal pin 31, FIG. 4. The supports 30a normally constitute an upper location for the usual three-point hitch receiving the top bar 14 therebetween.

A transverse bracket 32 bridges the openings 33 and has an opening 34 for receiving the pin 31 for securement as by a quick disconnect pin 35. The bracket 32 has a collar 36 integral therewith which is carried for vertical movement upon an upright guide 37 secured as by brackets 38 to the back of cam follower plate 25 adjacent the top. The transverse forwardly spaced member 40 of the box lever 17 carries vertically adjustable plows or leveling devices 41. The members 26 and 27 are secured between forwardly projecting supports 42 and the rearwardly extending frame members 28 as by pins 43 secured by suitable quick disconnect pins 44. Thus, the cam follower B is located at the three-point connections which are normally connected directly to the corresponding connections on the tractor as described above for constituting a three-point hitch. Referring again to FIGS. 1 and 2, it will be observed that the upwardly and inwardly extending transversely disposed cam A includes a plate 45 corresponding to the plate 25. The stub shafts 11 and 12 are illustrated as being secured as by welding at 46 along lower edge portions of the plate 45.

By positioning the stub shafts directly beneath the plate, the distance between the tractor and the implement may be reduced because the attachment of the present invention thus occupies a shortened longitudinal dimension. The plate 45 has a centrally located passageway 47 therein for alignment with the centrally disposed passageway 48 carried by the plate 25 of the cam follower B. These passageways are maintained in alignment when the cam A is arranged in interlocking relationship with the cam follower and permit a suitable conventional drive (not shown) to be connected to a power takeoff 49 on the tractor to drive some mechanism such as a mower or sower (not shown) on the implement.

Figure 12:
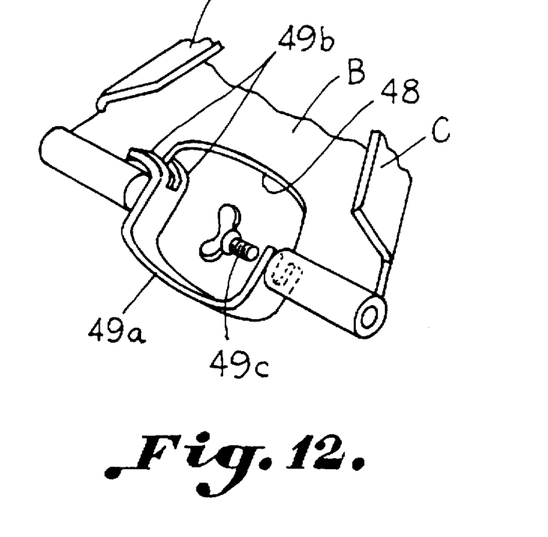
FIG. 12 is a perspective view illustrating a retainer for temporarily supporting a drive mechanism carried on the implement prior to connection to a power takeoff on the tractor.

By referring to FIG. 12, it will be noted that a retainer 49a may be removably positioned across the opening 48 in the cam follower B for releasably positioning a drive member for the mechanism on the implement to be driven from the power takeoff. The retainer may be fastened on one end by a bifurcated portion 49b and releasably secured by a suitable threaded fastener 49c at the other end for retaining a drive member (not shown) connected to the mechanism preparatory to hitching after which the drive member is supported by the power takeoff 49.

Referring especially to FIGS. 1, 2, and 9-11, it will be observed that the generally wedge shaped cam A has inwardly and forwardly extending camming members 50 integral with each side thereof for being received within inwardly tapering lips 51 carried integrally at respective sides of the plate 25. The camming or outer surfaces of the members 50 engage the inner surfaces of the lips 51. The members 51 and 50 are preferably formed by bending respective sides of the plates 25 and 45 to taper forwardly and inwardly at acute angles in opposed relation across respective plates on a press brake and are complementary to each other. Spaced reinforcing strips 52 may be utilized in order to reduce the thickness required for the plate member 25 and the lips carried thereby.

By backing the tractor the upright cam A is at least partially aligned so as to be beneath the cam follower B with respective plates 25 and 45 closely adjacent each other or in direct contact.

Figure 6:
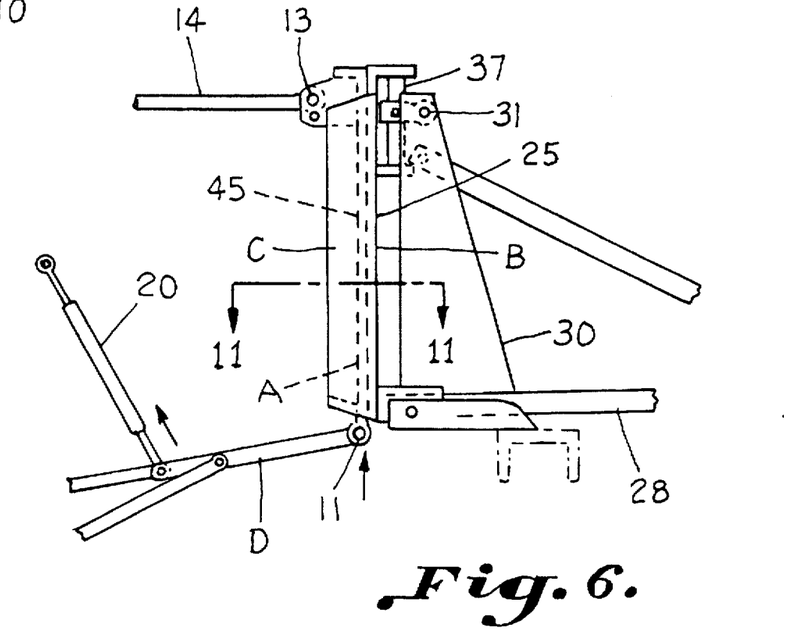
FIG. 6 is a schematic side elevation illustrating the parts in engaged position raising the implement.
Figure 7:
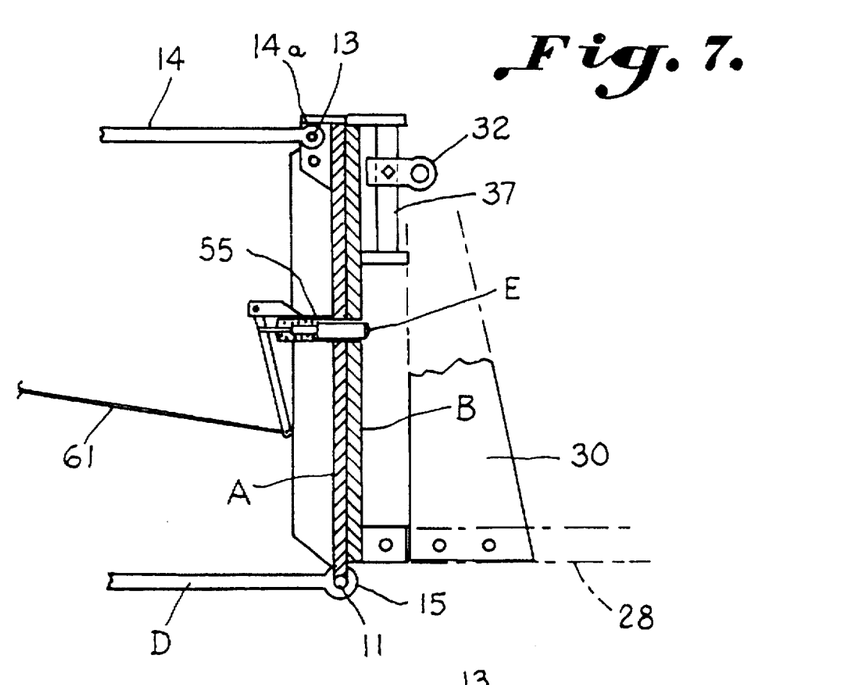
FIG. 7 is a sectional side elevation taken on the line 7—7 in FIG. 2 illustrating the parts in fully engaged position with the hydraulic lift arms raised to engage a spring biased latching member to loosely secure the upright camming member carried by the implement to the cam follower to prevent dislodgement when the hydraulic arms are lowered as by gravity and to avoid untoward dislodgement of the hitch as when encountering an obstacle during operation.
Figure 8:
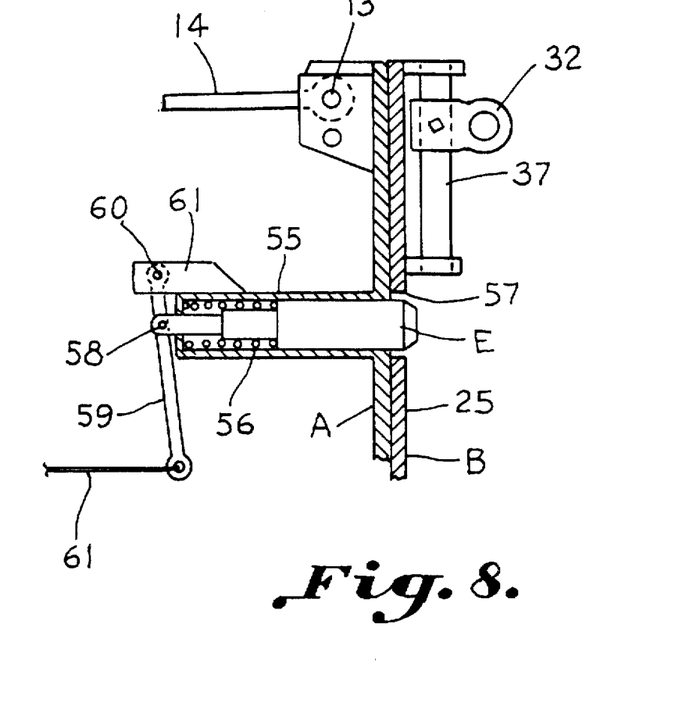
FIG. 8 is an enlarged longitudinal sectional elevation further illustrating the operation of the spring biased latching member.
Figure 9:
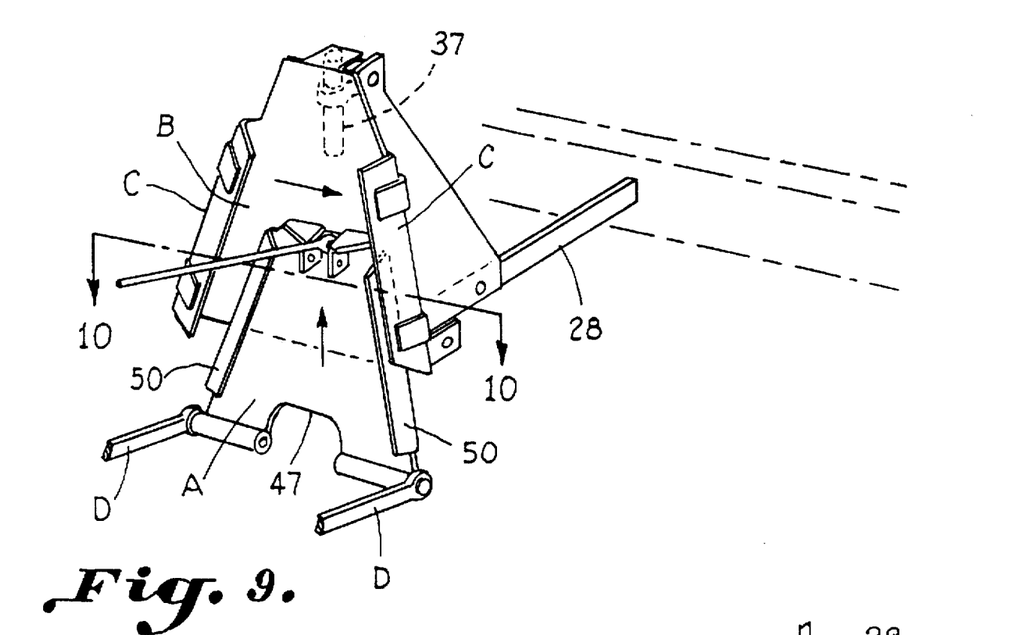
FIG. 9 is a perspective view illustrating the guiding action of one of the inwardly and forwardly tapering lips carried by the sides of the cam follower for engaging a camming surface on one of the sides of the upright cam.
Figure 10:
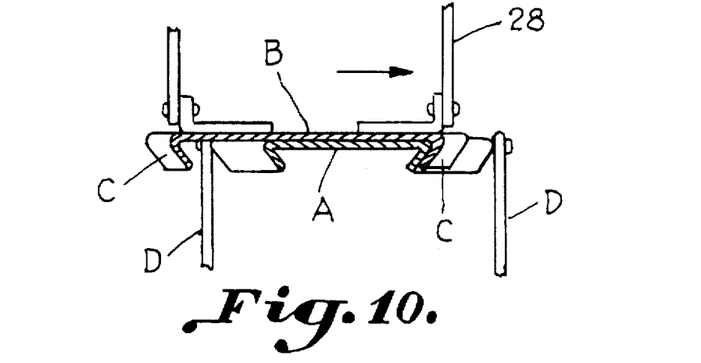
FIG. 10 is a sectional plan view taken on the line 10—10 in FIG. 9.
Figure 11:
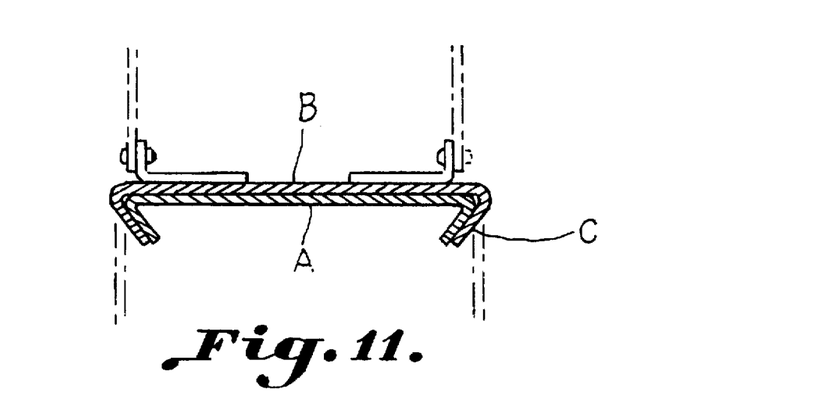
FIG. 11 is a plan view taken on the line 11—11 in FIG. 6 illustrating the parts in fully engaged position.

Referring more particularly to FIGS. 5-11, it will be observed that the cam A is then inserted into the cam follower B by exerting an upward force in the direction of the arrow upon the lift arms D in order to engage the cam follower in interlocking engagement for transport of the implement. In FIG. 9 it will be observed that an upper edge of at least one of the inwardly extending members 50 engages a lower portion of a corresponding lip 51 of the cam follower. The resulting camming action moves the cam follower B to the right in FIG. 10 and pulls the wedge shaped plate members comprising the cam A and cam follower B together as illustrated in FIGS. 10 and 11. This camming or wedging action continues as the lift arms D raise the cam into full interlocking wedging engagement as illustrated in FIGS. 6, 8 and 11. The marginal lips C act as guides as well as affording bearing surfaces receiving the cam A in interlocking relation against relative lateral and upward movement. The lips also act as bearing members against which the forward pulling force of the tractor is exerted during transport.

Referring more particularly to FIGS. 7 and 8, a latch is illustrated in the form of a spring biased pin E which is mounted within a cylindrical housing 55 secured as by welding to the cam A. The housing contains a compression spring 56 which urges the pin or plunger E to the right in FIGS. 7 and 8 so as to be loosely received within an opening 57 in the plate 25 of the cam follower B thus avoiding dislodgement of the cam should the lift arms D fall by gravity after the cam has achieved interlocking engagement with the cam follower. The latch E is pivotally connected as at 58 intermediate the ends of a link 59. The link is pivotally secured as at 60 on the housing 55 and suitable linkage such as a flexible cable 61 may be pulled by the operator while upon the seat 62 on the tractor for exerting a pulling force releasing the latch E.

Figure 13:
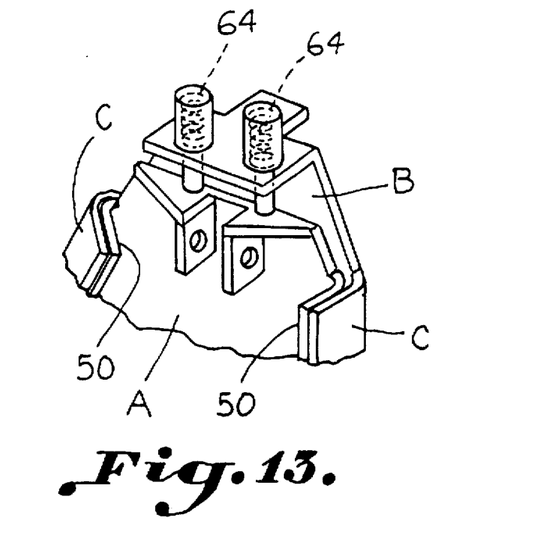
FIG. 13 is a perspective view illustrating an aid to the release of the cam from the cam follower when disconnecting the hitch.

It may be desirable to position compressible devices such as the spaced springs 64 (FIG. 13) to exert a resilient force between the cam A and cam follower B. Such devices may take the form of transversely spaced springs as illustrated or air cylinders and the like for developing a thrusting action in response to raising the cam A tending to separate the cam from interlocking relation with the cam follower upon lowering of the hydraulic lift arms D should there develop frictional forces tending to maintain such engagement or inhibit ready release of the cam. If desired, a hydraulic cylinder and the like may be utilized in lieu of the compressible devices. Another way of facilitating separation of the cam and cam follower upon lowering of the hydraulic mechanism is providing different tapers respectively between the cam and cam follower in both the transverse and in the longitudinal directions.

Figure 14:
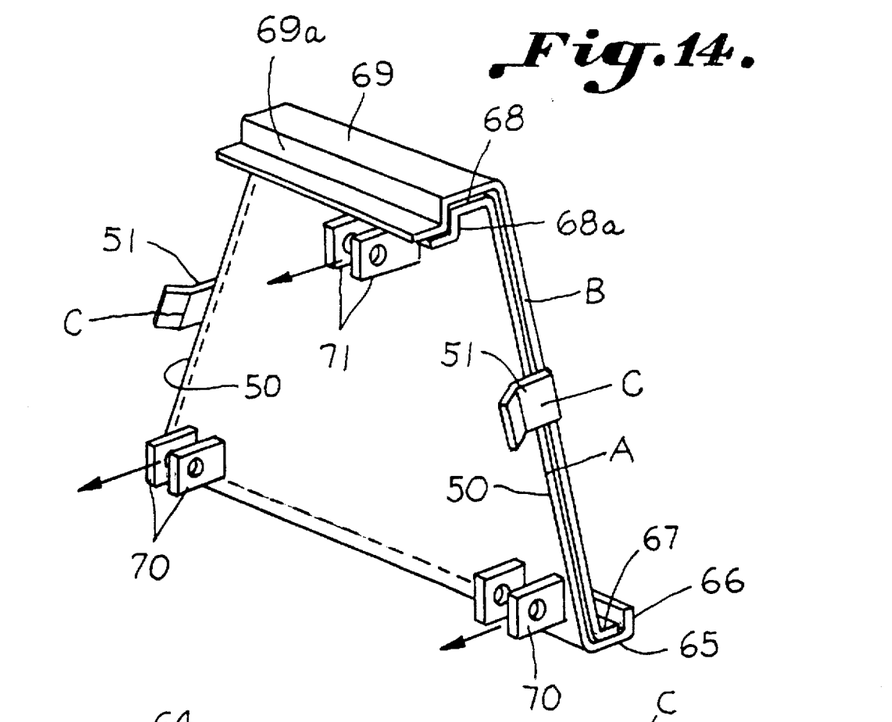
FIG. 14 is a perspective view illustrating a modified form of the invention wherein upper and lower horizontal abutments provide interlocking bearing surfaces for securement of the cam in operating position.

FIG. 14 illustrates a modified form of the invention wherein a cam A is received within a cam follower B which has marginal camming surfaces on the sides 50 for reception between the forwardly extending lips C integral with the upwardly and inwardly converging sides of the cam follower B and which extend only partially herealong.

The cam A includes a rearwardly extending lower flange 65 which has an upturned edge 66 for engaging an inwardly extending lower flange 67 carried by the cam follower B. Corresponding horizontal upper surfaces are carried by the cam as at 68 and by the cam follower as at 69. These horizontal surfaces are provided with interlocking downwardly extending surfaces 68a and 69a, respectively. These surfaces, together with the inwardly extending members 65 and 67, constitute interlocking bearing surfaces engaged for pulling and lifting during transport of the implement. The cam member A is illustrated as including suitable forwardly extending brackets 70 for locating the lower spaced connections of a three-point hitch, whereas a bifurcated upper bracket 71 serves as the upper connection for a three-point hitch.

It is thus seen that an improved hitch has been provided which may be self-aligning for use between a powered vehicle and a device carried thereby as by towing or lifting. The term tractor is used herein in it broadest sense for designating powered towing and lifting vehicles. The self-aligning feature makes hitching easier, quicker and useful in a wide variety of applications. Since the cam and cam follower taper upwardly and inwardly and they are preferably truncated at the top, as illustrated, so as to permit the inward tapering of cam and cam follower at an acute angle so as to provide a desirable camming or guiding action during hitching.

While a preferred embodiment of the invention has been described using specific terms, such description is for illustrative purposes only, and it is to be understood that changes and variations may be made without departing from the spirit or scope of the following claims.

What is claimed is:

1. A hitch for securing a device for transport by a tractor comprising:

an inwardly tapering cam positionable transversely in upright position on said tractor;

an inwardly tapering cam follower positionable transversely in upright position on said device for engagement by marginal surfaces of said upright cam;

a pair of opposed marginal forwardly and inwardly tapering guiding elements on said cam follower for moving said cam follower laterally into interlocking wedging engagement relative to said cam against substantial further movement with respect thereto during the transport; and power operated apparatus for carrying said cam on said tractor forcefully moving said cam causing said cam to engage said guiding elements to effect interlocking wedging engagement therewith;

whereby said hitch may be easily and quickly secured by an operator while seated upon the tractor.

2. The hitch set forth in claim 1 wherein said guiding elements are lips, and said cam tapers upwardly and inwardly for engaging said lips when moved upwardly by said power operated apparatus.

3. The hitch set forth in claim 2 wherein said lips confine and contain said cam in interlocking engagement supporting said device during transport.

4. The hitch set forth in claim 2 wherein said cam has upwardly and inwardly tapering sides complementary to said lips extending forwardly and inwardly of said cam.

5. The hitch set forth in claim 1 including automatically engageable latching means loosely securing said cam with respect to said cam follower against relative vertical movement when said cam is moved by said power operated apparatus into said interlocking engagement with said cam follower.

6. The hitch set forth in claim 3 wherein said latching means includes a spring biased member carried by said cam movable into engagement with said cam follower by said spring for limiting movement between said cam and said cam follower.

7. An attachment for securing an implement for lifting and towing by a tractor having spaced hydraulically operated lift arms and fastening locations for a three-point hitch comprising:

a cam securable at said fastening locations transversely in upright relation on said lift arms;

a pair of transversely spaced opposed upwardly and inwardly converging camming surfaces on opposite sides of said cam;

a cam follower positionable transversely on said implement; and an upwardly and inwardly converging guide extending forwardly and inwardly adjacent each side of said cam follower;

whereby said hitch may be automatically secured by an operator while seated upon the tractor, by backing said tractor positioning said camming surfaces between said guides and thereafter raising said lift arms causing at least one of said camming surfaces to engage at least one of said guides and to move said cam follower into interlocking wedging engagement with said cam.

8. The attachment set forth in claim 7 including:

mounting connections on said cam for mounting said cam on said lift arms for vertical movement with respect to said cam follower for effecting said interlocking engagement against substantial vertical movement therebetween; and latching means securing said cam follower with respect to said cam when moved by said lift arms maintaining said interlocking engagement.

9. The attachment set forth in claim 7 wherein said cam and said cam follower provide respective complementary camming and guiding surfaces engageable as said cam is moved upwardly with respect to said follower for guiding said cam follower into said interlocking wedging engagement therewith.

10. The attachment set forth in claim 9 including interlocking upwardly and forwardly extending camming and guiding members integral with said cam and said cam follower respectively having surfaces which taper inwardly from sides of said cam and said cam follower respectively providing bearing surfaces by which said cam supports said cam follower in interlocking relation during towing.

11. The attachment set forth in claim 7 including interlocking upper and lower surfaces carried by said cam and said cam follower providing bearing surfaces by which said cam supports said cam follower in interlocking relation during towing.

12. The attachment set forth in claim 7 including a vertically adjustable mounting connection on said cam follower for securement to said implement.

13. An attachment for hitching to a device for transport by a tractor having an hydraulic lifting apparatus thereon comprising:

an upwardly and inwardly tapering substantially wedge shaped first plate for connection to the hydraulic lifting apparatus;

forwardly projecting camming members extending integrally from marginal portions of the first plate forming a wedge shaped insert;

a complementary upwardly and inwardly tapering substantially wedge shaped second plate for connection to the device; and forwardly and inwardly projecting guide members extending integrally from marginal portions of the second plate forming a wedge shaped receptacle for receiving the insert when moved into alignment by positioning of the tractor and raised by the hydraulic lifting apparatus guiding the receptacle into interlocking wedging engagement with the insert;

whereby the device may be hitched to the tractor by an operator while seated upon the tractor.

14. The attachment set forth in claim 13 wherein the hydraulic lifting apparatus includes spaced lifting arms extending rearwardly of the tractor, and including spaced pivotal connections on the substantially wedge shaped insert at spaced lower points to respective lifting arms and at an upper point to the tractor forming respective connections of a three-point hitch.

15. The attachment set forth in claim 14 including complementary three-point connections for fastening the substantially wedge shaped receptacle to the device.

16. The attached set forth in claim 15 including a spring biased latch for extending between the substantially wedge shaped insert and the substantially wedge shaped receptacle maintaining the interlocking engagement.

17. The attachment set forth in claim 16 wherein the latch is a spring biased pin carried by the insert for loose reception by the substantially wedge shaped receptacle for limiting lowering of the substantially wedge shaped insert after hitching.

18. The attachment set forth in claim 17 including linkage for withdrawing the spring biased pin from reception by the substantially wedge shaped receptacle which may be actuated by the operator while seated upon the tractor.

19. The attachment set forth in claim 13 wherein the substantially wedge shaped insert includes opposed forwardly and inwardly tapering camming members carried by opposite sides thereof; and wherein the substantially wedge shaped receptacle includes opposed forwardly and inwardly tapering complementary lips integrally carried by opposite side edges thereof for engagement by at least one of the camming members for moving the substantially wedge shaped receptacle into interlocking wedging engagement for hitching and for support during transport.

20. The attachment set forth in claim 13 including aligned passageways in the substantially wedge shaped insert and in the substantially wedge shaped receptacle for receiving a driving connection to the device from a power takeoff on the tractor.

21. The attachment set forth in claim 20 wherein a retaining member is releasably positionable across a lower opening in said passageway in said wedge shaped receptacle for supporting said driving connection to the device.

22. A hitch for securing a device for transport by a tractor having a power operated lifting apparatus thereon comprising:
   a cam presenting marginal camming surfaces thereon positionable in upright transverse relation on said tractor;
   a cam follower presenting opposed outwardly extending inwardly tapering guiding surfaces positionable in upright transverse relation on said device for engagement of said guiding surfaces by said camming surfaces;
   mounting connections for securing said cam follower on said device;
   said guiding surfaces on said cam follower moving said cam follower into interlocking wedging relation with said cam against substantial movement in respect thereto; and
   mounting connections carrying said cam on said lifting apparatus for upward movement exerting a camming action, guiding said cam follower and effecting said interlocking relation with said cam follower;
   whereby said hitch may be secured by an operator while seated upon the tractor.

23. The hitch set forth in claim 22 wherein said cam follower includes a substantially wedge shaped plate member; and wherein said guiding elements include integral opposed sides tapering forwardly and inwardly formed by having been bent from a plate member forming said wedge shaped member.

24. The hitch set forth in claim 23 wherein said cam has complementary integral opposed sides for guiding said cam follower and supporting same in interlocking engagement.

25. The hitch set forth in claim 24 including an inwardly and downwardly extending upper edge integral with said cam follower for support upon said cam during transport; and wherein said sides extend only partially along sides of said cam follower.

26. The hitch set forth in claim 22 wherein said respective connections are at locations for effecting a three-point hitch.

27. The hitch set forth in claim 26 including a latch carried by said cam movable into engagement with said cam follower when in interlocking engagement for transport of said device.

28. An attachment for hitching to a device for transport by a tractor having a power operated lifting apparatus thereon comprising:
   an upright substantially wedge shaped insert for connection to the lifting apparatus;
   an upright substantially wedge shaped receptacle for connection to the device for receiving the insert when moved into substantially vertical alignment by positioning of the tractor; and
   complementary engaging marginal surfaces extending forwardly and tapering inwardly carried by said insert and by said receptacle guiding the receptacle laterally into interlocking relation with the insert when said insert is raised by the lifting apparatus;
   whereby the device may be hitched to the tractor by an operator while seated upon the tractor.

29. A method of hitching to a device for transport by a tractor having power operated lifting apparatus thereon comprising the steps of:
   connecting a wedge shaped insert to the lifting apparatus in upright relation thereon;
   connecting a wedge shaped receptacle to the device for receiving the insert;
   moving the tractor positioning the insert beneath the receptacle;
   providing complementary marginal forwardly and inwardly tapering surfaces carried by the receptacle; and
   guiding the receptacle laterally relative to the insert into interlocking wedging relation with the insert by moving the insert upwardly by raising the lifting apparatus;
   whereby the device may be hitched to the tractor by an operator while seated upon the tractor.

30. A method of securing an apparatus for towing by a tractor comprising the steps of:
   mounting an upright wedge shaped cam for securing said apparatus;
   guiding a wedge shape cam follower by engaging the cam with at least one of a pair of transverse opposed inwardly tapering guiding surfaces on said cam follower;
   carrying said cam for vertical movement responsive to power operated means between said upwardly and inwardly tapering guiding surfaces effecting interlocking wedging engagement with said cam follower; and
   engaging latching means securing said cam follower with respect to said cam when raised by said power operated means maintaining said interlocking engagement;
   whereby said hitch may be secured by an operator while seated upon the tractor.

31. The method set forth in claim 30 including the step of latching said cam follower with respect to said cam when said cam is raised by said power operated means by engaging a spring biased plunger carried by said cam with said cam follower maintaining said interlocking engagement.

32. The method set forth in claim 31 including the steps of providing a linkage for releasing said latching means by an operator from a tractor seat; and exerting a force between said cam follower and said cam facilitating release of the interlocking engagement between said cam and said cam follower upon such release of said latching means.

33. The method set forth in claim 30 including the step of providing a wedge shaped plate for said cam follower integrally positioning said transverse opposed upwardly and inwardly tapering guiding surfaces.

34. The method set forth in claim 33 including the step of bending sides of said plate inwardly there across forming the guiding surfaces.

* * * * *